Figure 1:
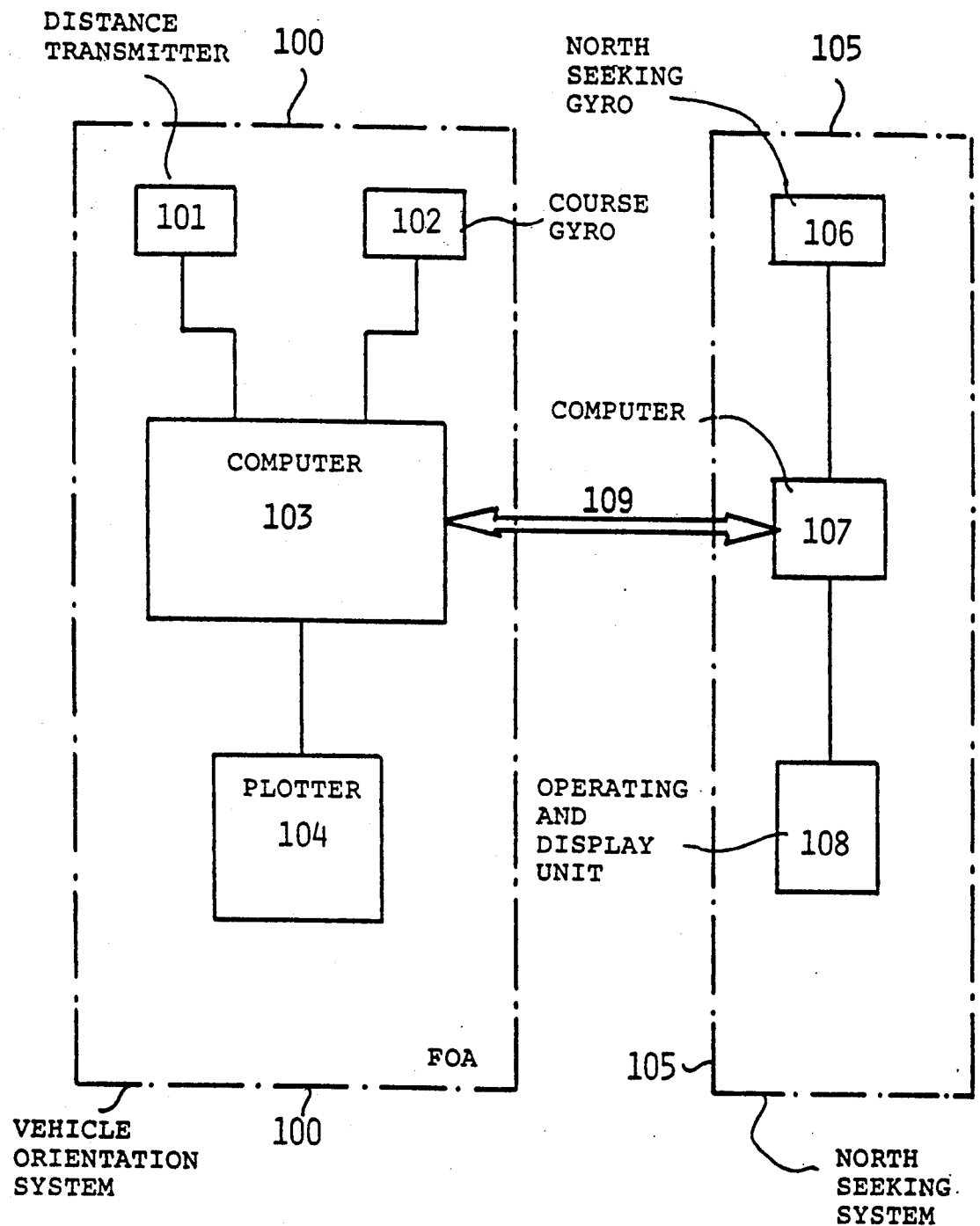

United States Patent [19]

Sindlinger et al.

[11] Patent Number: 5,014,205
[45] Date of Patent: May 7, 1991

[54] VEHICLE HAVING AN ON-BOARD NAVIGATION SYSTEM

[75] Inventors: Rainer Sindlinger, Hirschberg; Peter Kocks, Heidelberg, both of Fed. Rep. of Germany

[73] Assignee: Teldix GmbH, Heidelberg, Fed. Rep. of Germany

[21] Appl. No.: 341,396

[22] Filed: Apr. 21, 1989

[30] Foreign Application Priority Data

May 3, 1988 [DE] Fed. Rep. of Germany ....... 3814958

[51] Int. Cl.$^5$ ............................................. G06F 15/50
[52] U.S. Cl. .................................... 364/449; 364/443; 364/453
[58] Field of Search ............... 364/443, 449, 450, 451, 364/453, 454, 423; 33/316, 318–321

[56] References Cited

U.S. PATENT DOCUMENTS

| | | | |
|---|---|---|---|
| 4,166,406 | 9/1979 | Maughmer | 89/1.815 |
| 4,693,114 | 9/1987 | DeCarlo et al. | 73/178 R |
| 4,713,767 | 12/1987 | Sato et al. | 364/453 |
| 4,783,744 | 11/1988 | Yueh | 364/454 |
| 4,800,501 | 1/1989 | Kinsky | 364/453 |
| 4,807,138 | 2/1989 | Krogmann | 364/453 |
| 4,899,235 | 2/1990 | Nakayama et al. | 364/453 |

FOREIGN PATENT DOCUMENTS

| | | |
|---|---|---|
| 0268278 | 11/1987 | European Pat. Off. . |
| 0276663 | 1/1988 | European Pat. Off. . |
| 2136589 | 2/1973 | Fed. Rep. of Germany . |
| 2545025 | 7/1977 | Fed. Rep. of Germany . |
| 2910386 | 9/1980 | Fed. Rep. of Germany . |
| 2942452 | 4/1981 | Fed. Rep. of Germany . |
| 2004063 | 4/1982 | United Kingdom . |
| 3111131 | 9/1982 | Fed. Rep. of Germany . |
| 3146688 | 6/1983 | Fed. Rep. of Germany . |

OTHER PUBLICATIONS

Teldix, "Überall, Wo Neue Ideen Gebraucht Werden", 2291VL 5–86 Sp. (39), PS. 12/13.
Teldix: Whenever New Ideas are Needed; 229 E/VL 5.86 SP(30), U.K. Examiner's Report, 7/19/89.
Teldix: Vehicle Orientation Systems; 170.2 E/V 5.85 GD(10).
Teldix: North Seeking Gyro System; 191 E/V 7.82 GD(30).

Primary Examiner—Thomas G. Black
Attorney, Agent, or Firm—Spencer & Frank

[57] ABSTRACT

A vehicle is disclosed which carries a vehicle orientation system FOA together with a north-seeking system operating independently therefrom for orienting its equipment.

According to the invention, the two systems are bidirectionally linked together and results determined in the individual systems are transmitted to the respectively other system so as to increase its accuracy and for other corrections.

17 Claims, 2 Drawing Sheets

VEHICLE HAVING AN ON-BOARD NAVIGATION SYSTEM

STATE OF THE ART

The TELDIX brochure entitled "Überall, wo neue Ideen gebrauchc werden" [Wherever New Ideas Are Needed], published by TELDIX GmbH under 229/VL 5.86 Sp. (39), pages 12/13, discloses equipping a vehicle, instead of with an on-board navigation system including a north-seeking gyro, with a less expensive vehicle orientation system FOA which does not include a north-seeking device but in which navigation errors are detected and corrected when points that can be detected on a chart are traversed. The corrections then permit a conclusion as to gyro and tracking errors and these are corrected. For the initial orientation, either an orientation path is traveled or the stored direction as it resulted at the end of the preceding trip is employed.

The same brochure, page 8 and page 12, also discloses the aligning of weapons, radar devices and the like carried on a vehicle by means of a north-seeking gyro system whose core is a north-seeking gyro. For operation of this system, the approximate location (accurate to about 1 km) must be known. Additionally, it is desirable for the system to prealign the north-seeking gyro approximately (within about 3°) in the north direction to thus reduce the north-seeking time.

ADVANTAGES OF THE INVENTION

If now the two above-described autonomous systems, which are actually able to and should operate completely independently of one another, are carried along in a vehicle, for example in armored howitzers, radar vehicles or rocket launchers, and are employed separately, the inventive linking of the two systems makes it possible to improve at least one of the systems, preferably, however, both of them, by the exchange of information.

It is proposed to combine the vehicle orientation system FOA and the north-seeking system by means of a bidirectional data interface over which the following data can be exchanged, at least in part:

FOA→north-seeking system (1) position coordinates; since the accuracy is in the range of meters, it is more than sufficient for the north-seeking process;
(2) direction information; accuracy is about 0.5° and is thus sufficient for a rough orientation of the north-seeking gyro.

North-seeking system→FOA:

(3) direction information; an accuracy of 0.05° to 0.1° is sufficient for initial and intermediate orientation (updating) of the FOA; prerequisite is a directional association of the installed positions of the FOA and the north-seeking system.

Other exchangeable data are defined in the patent claims.

The invention realizes a number of advantages, namely:

no manual position coordinate input needed in the north-seeking system;
shorter north-seeking time by transferral of rough directional information angles;
plausibility tests are possible by comparing headings;
initial orientation of the FOA; thus faster operational readiness;
elimination of the orientation path for initial orientation of the FOA;
updating of the FOA by north-seeking when the vehicle is stopped (improvement of direction and position accuracy); thus less dependence on surveyed navigation points for correction;
avoidance of errors in the (manual) input of data;
possibility of connecting further devices to the data linkage.

DESCRIPTION OF THE DRAWING FIGURES

Figure 2:
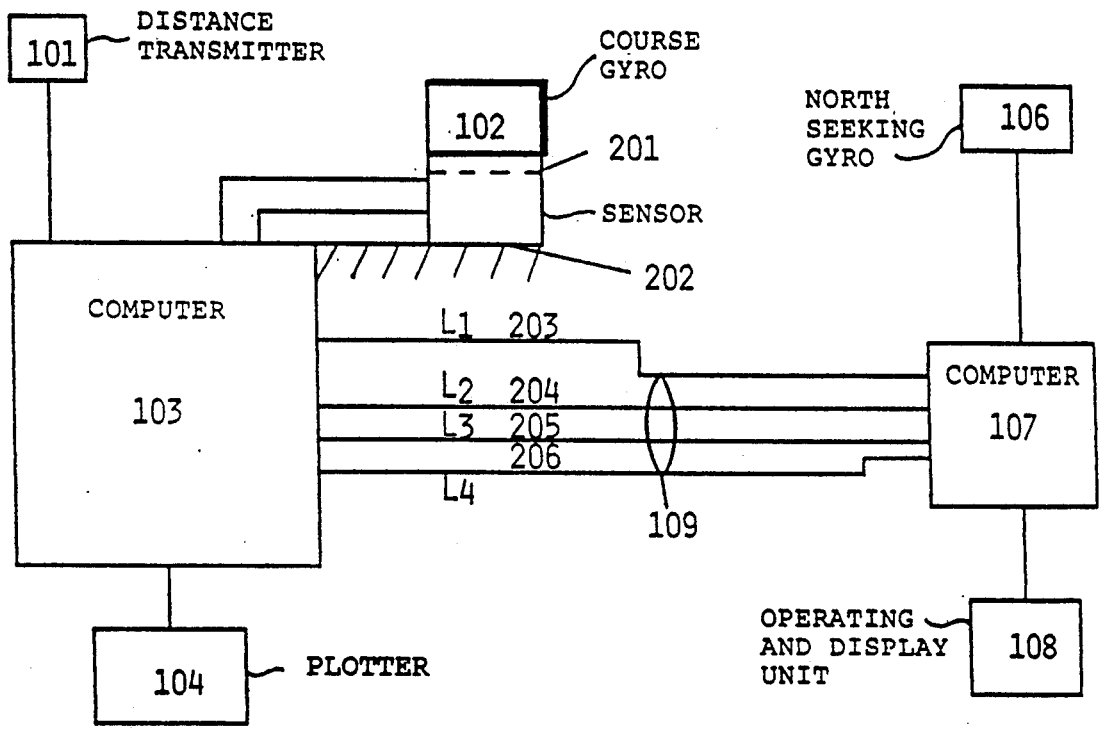
Figure 3:
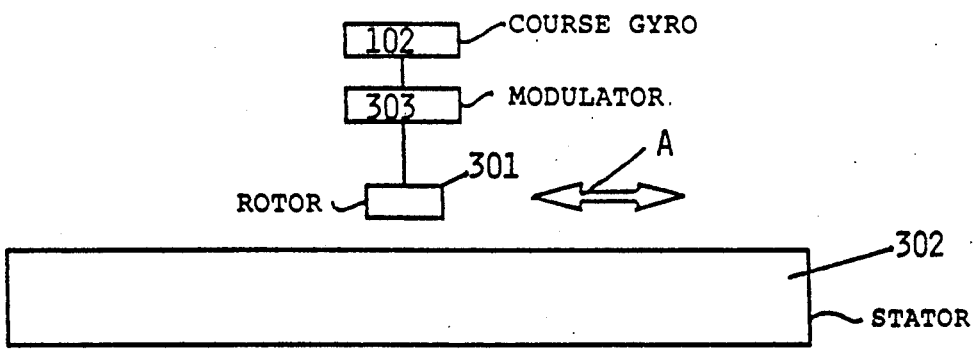

One embodiment of the invention is shown in principle in FIG. 1 of the drawing. FIG. 2 shows a detailed embodiment and FIG. 3, shows in principle, the measurement of angles and data transfer if a gyro is accommodated in the vehicle turret.

A vehicle orientation system 100 according to FIG. 1 is composed of a distance transmitter 101, a course reference, e.g. a course gyro 102, and a navigation computer 103 as well as an operating and display device, e.g. a plotter 104. Distance transmitter 101 and course gyro 102 furnish their signals to computer 103 which calculates position signals therefrom and displays these on plotter 104.

If a position clearly noticeable on the chart, e.g. a bridge, is traversed and the system indicates a different position in plotter KG, the position is corrected by adjusting the display. The adjustment is reported back to computer 103 which then calculates correction values for the distance transmitter 101 and course gyro 102 signals and in the future corrects these values accordingly.

The north-seeking system 105 also carried along in the vehicle is composed of a north-seeking gyro 106, a computer 107 and an operating and display device 108. These components may also be combined in one device if required.

To orient, for example, a radar device at a preselected location, a north-seeking process is initiated by way of operating device 108 to accurately determine the north direction. This process is facilitated by an advance orientation of the north-seeking gyro 106 to the approximate north with the aid of rough north signals transmitted over the bidirectional linkage 109. The alignment of gyros 106 and 102 relative to one another must be known, however. The geographic latitude can also be furnished by computer 103. It is required for the north-seeking process. Thus, it is possible to correct not only the course error which occurred in the vehicle orientation system 100, for example, due to gyro drift. It is also possible to reduce the position error insofar as it is correlated with the course error. Conversely, the north value of the north-seeking gyro 106 which, after the north-seeking process, is highly accurate can be transmitted to the vehicle orientation system 100 to increase its accuracy.

In FIG. 2, computer 103 and computer 107 of FIG. 1 face one another. The position determined by the vehicle orientation system 100 or at least the determined geographic latitude is transmitted through line 203 to the north-seeking system 105 to there be considered during a subsequent north-seeking process. In addition, it is possible to transmit through a line 204 the orientation information determined by the vehicle orientation system 100 to the north-seeking system to 105 there be employed for the advance orientation. In addition, the meridian convergence can be transmitted to the north-seeking system 105 through a line 205.

Conversely, the very precise vehicle orientation determined by the north-seeking system 105 can be transmitted through a line 206 to the vehicle orientation system 100 to there be used to correct the heading indication of the vehicle orientation system 100. In this way, drift errors of the course gyro 102 can be eliminated. However, the improvement in the directional heading then also brings about an improvement in the vehicle position determined by the vehicle orientation system 100. Under consideration of the more accurate heading information, the vehicle orientation system 100 is also able to reduce the influence of an erroneous initial orientation of the course gyro 102.

If, for example, the course gyro 102 of the vehicle orientation system 100 is accommodated in a tank turret, the rotation of the tank turret relative to the tank body must be considered. This is assumed to be the case in FIG. 2 for course gyro 102. Rotation is possible between course gyro 102 and tank body 202 and is monitored by means of a position sensor 201. If position sensor 201 senses only the 0 position between the two components, it permits a transmission only in the case of the 0 position. However, the sensor 201 can also measure the rotation angle of the components relative to one another and can feed this rotation angle additionally to computer 103 for consideration. This is assumed to be the case in FIG. 2. If both gyros (102 and 106) are accommodated in the turret or in the tank body, relative rotation need not be considered.

Sensor 201 may be galvanic, capacitive or inductive or may operate optically. The rotor 301 of sensor 201 is then disposed in the turret and is faced by an expanded stator 302 in the tank body, with the part of the stator 302 charged by the rotor 301 signal indicating the rotation angle. This is shown, in principle, as a development in FIG. 3 where the rotor emitting the signal is marked 301 and the elongate stator is marked 302. During relative rotation, the rotor 301 travels in the direction of arrows A and thus charges different sectors of the stator 302. In the simplest case, this could be imagined, for example, to be a capacitance plate on the rotor 301 faced on the stator 302 by a plurality of plates. The location of maximum coupling provides the rotation angle. Additionally, the signal required to determine maximum coupling could be modulated (in 303) with the measuring result of the course gyro 102; this would avoid a further transmission between rotor 301 and stator 302.

We claim:

1. A vehicle including a vehicle orientation system which comprises
    a distance transmitter and
    a course gyro as the direction reference, and
    wherein navigation is effected with a required precision by correcting the orientation system when known positions are reached, and orientation of the course gyro relative to north is calculated from the deviation from a known position;
    a device, such as a weapon or radar, carried by the vehicle and having a north-seeking system, said north-seeking system including a north-seeking gyro on-board said device for orienting said device; and data exchange means connecting the vehicle orientation system and the north-seeking system for facilitating the transmitting of at least any information that can be utilized in one system obtained from the other system,
    whereby, the precision characteristics of at least the one system may be improved.

2. Vehicle according to claim 1, wherein position data is transferred from the vehicle orientation system to the north-seeking system.

3. Vehicle according to claim 1, wherein geographic latitude data is transferred from the vehicle orientation system to the north-seeking system.

4. Vehicle according to claim 1, wherein meridian convergence data is transferred from the vehicle orientation system to the north-seeking system.

5. Vehicle according to claim 1, wherein heading of the vehicle relative to north data is determined by the vehicle orientation system is transferred to the north-seeking system and utilized to pre-orient the north-seeking system.

6. Vehicle according to claim 5 including a rotatable component, such as a turret, in which at east one of the north-seeking gyro or the course gyro is accommodated, wherein the position of the rotatable component is sensed and this position is considered in the transmission of the heading.

7. Vehicle according to claim 6, wherein a zero position sensor between the vehicle body and the turret is employed as the position sensor and the transmission of the heading occurs only when the turret is in the zero position.

8. Vehicle according to claim 6, wherein an angular position sensor is disposed between the vehicle body and the turret as the position sensor, and transmitted headings are corrected as a function of angle differences between the turret and chassis, furnished by the angular position sensor.

9. Vehicle according to claim 6, wherein the position sensor is employed simultaneously as a data transmitter for transmission of data.

10. Vehicle according to claim 9, wherein the position sensor/data transmitter is realized by galvanic contacts.

11. Vehicle according to claim 9, wherein the position sensor/data transmitter is realized by an optical transmitter.

12. Vehicle according to claim 9, the position sensor/data transmitter is realized by an inductive transmitter.

13. Vehicle according to claim 9, the position sensor/data transmitter is realized by a capacitive transmitter.

14. Vehicle according to claim 1, wherein vehicle heading data measured by the north-seeking system is utilized to correct the direction indication of the vehicle orientation system.

15. Vehicle according to claim 1, wherein direction data measured by the north-seeking system is utilized to correct the vehicle position determined in the vehicle orientation system.

16. Vehicle according to claim 1, wherein the course gyro of the vehicle orientation system and the north-seeking system are disposed in the turret so that there always exists a directional relationship between the north-seeking system and the vehicle orientation system.

17. A vehicle, having a first on-board navigation system which includes:
    a distance transmitter,
    a course gyro, a display apparatus, and
a computer, which navigation system effects navigation with a required precision by correction of the system when known positions are reached, and the orientation of said course gyro relative to north is calculated from a deviation from a known position;

said vehicle being for holding and transporting one or more separate devices, each having a second on-board navigation system, said second on-board navigation system being a north-seeking system which includes:
a north-seeking gyro,
a computer, and
a display apparatus, wherein, said first on-board navigation system, and at least one of the second on-board navigation systems, are detachably connected by interface means for transferring navigation information between said first and said at least one of the second on-board navigation systems, while said vehicle holds said one or more separate devices.

* * * * *